United States Patent
Bell

(10) Patent No.: US 6,343,677 B2
(45) Date of Patent: Feb. 5, 2002

(54) SHOCK ABSORBER

(75) Inventor: Stephen H. Bell, Guelph (CA)

(73) Assignee: Gabriel Ride Control Products, Inc., Brentwood, TN (US)

( * ) Notice: Subject to any disclaimer, the term of this patent is extended or adjusted under 35 U.S.C. 154(b) by 0 days.

(21) Appl. No.: 09/774,546

(22) Filed: Jan. 31, 2001

Related U.S. Application Data

(63) Continuation-in-part of application No. 09/241,217, filed on Feb. 1, 1999, now Pat. No. 6,213,262.

(51) Int. Cl.[7] .................................................. F16F 9/34
(52) U.S. Cl. ................................. 188/315; 188/322.14
(58) Field of Search ........................... 188/266.5, 282.4, 188/299.1, 315, 322.14

(56) References Cited

U.S. PATENT DOCUMENTS

| | | | | | |
|---|---|---|---|---|---|
| 4,310,077 A | * | 1/1982 | Whiteside | .................... | 188/282 |
| 4,949,989 A | * | 8/1990 | Kakizaki et al. | ............. | 280/707 |
| 4,971,180 A | * | 11/1990 | Kobayashi et al. | ......... | 188/319 |
| 4,973,854 A | * | 11/1990 | Hummel | .................. | 267/64.26 |
| 5,113,980 A | * | 5/1992 | Furrer et al. | ................. | 188/299 |
| 5,205,385 A | * | 4/1993 | Ashiba | ........................ | 188/299 |
| 5,277,283 A | * | 1/1994 | Yamaoka et al. | ............ | 188/319 |
| 5,386,893 A | * | 2/1995 | Feigel | .......................... | 188/299 |
| 5,464,079 A | * | 11/1995 | Lohberg et al. | ............. | 188/315 |
| 6,003,644 A | * | 12/1999 | Tanaka | ..................... | 188/266.5 |
| 6,213,262 B1 | * | 4/2001 | Bell | ............................ | 188/315 |

\* cited by examiner

*Primary Examiner*—Christopher P. Schwartz
(74) *Attorney, Agent, or Firm*—McAndrews, Held & Malloy, Ltd.

(57) ABSTRACT

The motor vehicle shock absorber selectively enables the selective realtime adjustments to the shock absorber damping based on driving conditions and desired driving characteristics. The adjustments are achieved by using a solenoid assembly to exert a valve closing force, which is selectively adjustable, on the compression valve and so as to control the damping characterization of a shock absorber. The design and construction of the compression head assembly and end cap assembly of the shock absorber permit these assemblies to be manufactured as subassemblies and then brought together and expeditiously assembled so as to minimize the cost of manufacturing the shock absorber.

21 Claims, 2 Drawing Sheets

SHOCK ABSORBER

CROSS-REFERENCE TO RELATED APPLICATIONS

This patent application is a continuation-in-part of U.S. patent application Ser. No. 09/241,217 filed Feb. 1, 1999, now U.S. Pat. No. 6,213,262. The disclosure of patent application Ser. No. 09/241,217 is incorporated herein by reference thereto.

BACKGROUND OF THE INVENTION

The present invention relates to hydraulic shock absorbers for motor vehicles, for example, including snowmobiles. More specifically, the present invention relates to motor vehicle hydraulic shock absorbers that because of their design and construction are adapted for facile and relatively inexpensive manufacture while affording real time, selectively variable damping characteristics.

Shock absorbers are commonly used in vehicle suspension systems to absorb unwanted vibrations that occur during driving. Specifically, shock absorbers are generally connected between the body (sprung mass) and the suspension (unsprung mass) of the vehicle to dampen the vibrations transmitted from the suspension to the body.

Motor vehicle shock absorbers usually have a hollow cylinder defining an internal chamber or cavity that is filled with fluid and that is divided into working compartments (viz., a compression compartment and a rebound compartment) by a piston assembly slidably positioned in the internal chamber. The compression and rebound compartments are usually in fluid communication with a reservoir compartment. Shock absorbers also usually include internal valving that permits fluid to flow between the compression, rebound and reservoir compartments as the piston assembly moves within the internal chamber.

One end of the shock absorber cylinder is closed and is typically connected to the vehicle suspension by a suitable linkage. A piston rod extends through a seal assembly mounted in the other end of the cylinder. The piston rod has its inner end connected to the piston assembly and its outer end connected to the vehicle body by a suitable connector.

A shock absorber usually also includes a compression valve, a replenishing valve and valving in the piston assembly to control or restrict the flow of damping fluid within the shock absorber during the compression and extension strokes of the shock absorber, thereby providing a damping force, which "smooths" or "dampens" vibrations transmitted from the suspension to the body. The damping characteristics of a shock absorber are determined by the fluid pressure differential across the piston assembly required to drive the fluid between the compression, rebound and reservoir compartments. This pressure differential and the resulting flow rate, in turn, control the speed at which the piston assembly may move in the cylinder responsive to the external forces applied to the shock absorber. The greater the degree to which the flow of damping fluid is restricted, the greater the damping forces that are provided by the shock absorber. Accordingly, a "soft" compression and rebound stroke is afforded when the flow of damping fluid between the working compartments is relatively unrestricted. By contrast, a "firm" compression and rebound stroke is afforded when there is an increased restriction in the flow of fluid between the working compartments.

Different desired driving characteristics, such as ride comfort, vehicle handling, and vehicle ground holding ability, depend on the amount of damping force provided by the motor vehicle's shock absorbers. The amount of damping force required to meet a particular set of driving characteristics is, in turn, dependent on driving surface conditions including, for instance, the terrain over which the vehicle travels, and the manner in which a vehicle is being driven. Because driving conditions and desired characteristics may change, often even within the scope of a single journey, the damping force required to meet the desired driving characteristics needs also to change often. This is particularly so when the vehicle being driven is a snowmobile.

A need has long existed for a motor vehicle shock absorber that provides for selective real-time damping characteristics in response to changing driving conditions and/or changes in desired driving "feel." Additionally, a need also exists for such a shock absorber that additionally may be reliably mass-produced on a relatively inexpensive basis.

SUMMARY OF THE INVENTION

Accordingly, it is an object of the present invention to provide an improved motor vehicle shock absorber that permits selective, real-time adjustment of the shock absorber damping characteristics.

Another object of the present invention is to provide an improved shock absorber of the type described that may be used in rugged, changeable driving conditions, such as those frequently encountered by a snowmobile, and that may be reliable and relatively inexpensively mass-produced.

Still another object of the present invention is to provide an improved shock absorber, as described, where a novel solenoid subassembly, which is part of a novel end cap assembly, is utilized to selectively and variably control the force required to unseat the shock absorber's compression valve, which is part of a novel compression head assembly, during movement of the piston assembly in the compression stroke direction or motion. A related object of the present invention is to provide an improved shock absorber, as described, where the design and construction of the novel end cap and compression head assemblies enable these assemblies to be separately manufactured, as sub-assemblies, and to be relatively inexpensively assembled together, in the shock absorber manufacturing facility.

The foregoing objects are met, in whole or in part, by the improved shock absorber of the present invention that includes novel compression head and end cap assemblies, and that provides desired changeable damping force characteristics through selective, real-time adjustable damping by using a solenoid subassembly, which is part of the novel end cap assembly, to variably control the force required to unseat the compression valve, which is a part of the novel end cap assembly and which is clamped against a valve seat on the novel compression head assembly, during movement of the shock absorber's piston assembly in the compression stroke direction. The design and construction of the novel compression head assembly and the novel end cap assembly facilitates their expeditious and sure assembly, as components of the shock absorber. Fluid flow past the compression valve during the compression stroke of the piston assembly is selectively controlled in a real-time adjustable manner by a solenoid subassembly, which is used to apply a selectively variable valve closure force to the compression valve, thereby regulating fluid flow between the compression compartment and the reservoir compartment during the compression stroke. The valve closure force applied by the solenoid subassembly may be controlled directly by the vehicle operator, or optionally by an autonomous shock absorption control system. Through the use of the present invention, shock absorption damping may be selectively adjusted in real-time in response to changing driving conditions or changes in desired driving characteristics. The advantages of real-time adjustable damping include increased safety and rider comfort.

These and other objects, advantages and benefits of the present invention will become apparent to those skilled in the art from the following detailed description of the preferred embodiment of the present invention with reference to the accompanying drawings.

In the following detailed description of the preferred embodiment of the present invention, spatially descriptive orienting terms such as "upper," "lower," "inner," "outer," "left," "right," "left-hand," "right-hand," "vertical," "horizontal," and the like, are utilized. It is to be understood that these terms are used for convenience of describing the preferred embodiment with reference to the foregoing drawings. These terms do not necessarily describe the absolute location in space that a component or part so described will assume when the shock absorber is in actual usage.

DETAILED DESCRIPTION OF THE PREFERRED EMBODIMENT

Figure 1:
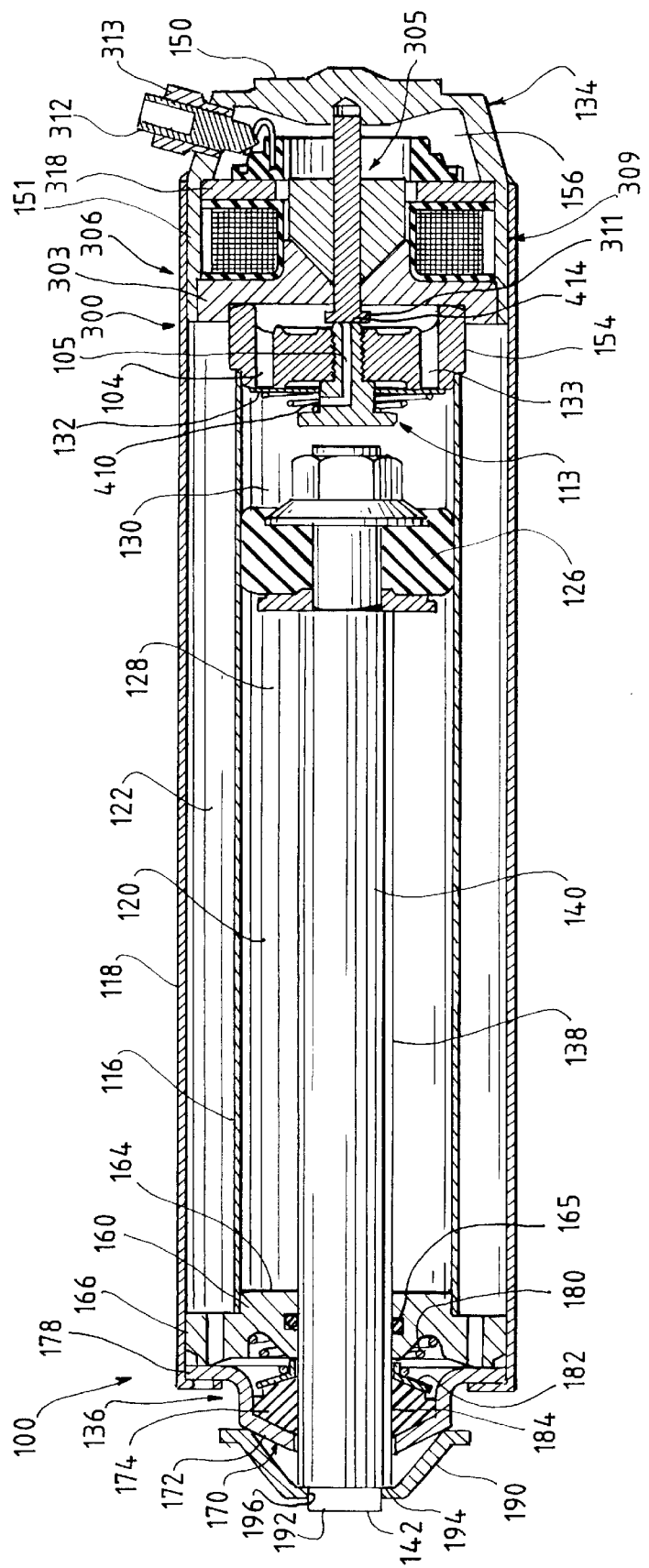
FIG. 1 is an axial, cross-sectional view of a preferred embodiment of the shock absorber of the present invention.

As illustrated in FIG. 1, the shock absorber 100 of the present invention is especially adapted for use with snowmobiles where the terrain over which the snowmobiles travel can vary significantly from one moment to the next and where the snowmobiles may be exposed to relatively wide ranges of temperatures.

The shock absorber 100 incorporates a number of assemblies, subassemblies and component parts that are of conventional design and construction. Except as otherwise noted below, these assemblies and parts, as utilized with the shock absorber 100, are as disclosed in U.S. Pat. Nos. 4,310,077 and 5,234,084, and the disclosures of these patents are hereby incorporated by reference. More specifically, and referring now to FIGS. 1–4, the shock absorber 100 includes inner and outer cylinders 116, 118 that extend coaxially and concentrically in a conventional manner. The inner cylinder 116 defines an internal chamber or cavity 120, and the annular space between the inner and outer cylinders 116,118 defines an annular reservoir compartment 122.

A conventional piston or, more specifically, piston assembly 126, is slidably mounted within the internal chamber 120 and divides the internal chamber 120 into a rebound working compartment 128 and a compression working compartment 130. The volumes of the working compartments 128 and 130 vary in accordance with the position of the piston assembly 126 in the chamber 120.

As is conventional, the end of the shock absorber 100 adjacent the rebound compartment 128 (that is, the left-hand end as shown in FIG. 1) is sometimes referred to as the open end or rod end. The end adjacent the compression compartment 130 (that is, the right-hand end as shown in FIG. 1) is commonly referred to as the closed end. The ends of the cylinders 116, 118, adjacent the closed end of the shock absorber 100, are closed by a novel end cap assembly 134. The ends of the cylinders 116, 118, adjacent the rod end, are closed by a conventional rod end closure assembly 136.

A piston rod 138 has an inner end 140 connected with the piston 126. The outer end 142 of the rod 138 slidably and sealably projects through the closure assembly 136 in a conventional manner.

Figure 4:
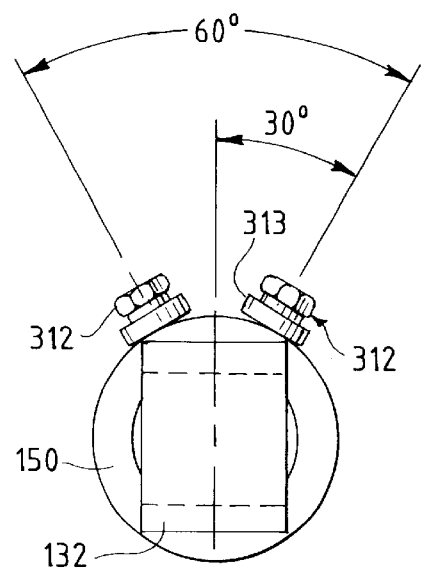
FIG. 4 is an end view of the closed end of the shock absorber of the present invention and illustrates the orientation of the solenoid terminals with respect to the lower shock mounting connector.

The shock absorber 100 is adapted to be connected between two masses, for instance, between the vehicle's body and the vehicle's suspension. For this purpose, an eye connector 132 (as shown in FIG. 4) is typically secured to the center of the exterior surface of the end cap assembly 134 so that the connector 132 is aligned with the longitudinal axes of the piston rod 138 and the chamber 120 and so that the connector 132 may be used to secure the shock absorber 100 to the vehicle's suspension. Similarly, the outer end 142 of the piston rod 138 is typically threaded to permit it to be secured to a mounting aperture on the vehicle's body by, for example, by a reciprocal nut. Alternatively, the outer end 142 of the piston rod 138 could also include an eye connector.

The end cap assembly 134 includes a cap member 150 whose distal annular wall portion 151 faces the rod end and is connected, by welding, to the right-hand end of the outer cylinder 118 so as to seal and close the right end of the outer cylinder 118. The end cap assembly 134 is disposed adjacent a novel compression head assembly 154 that is connected, by a press fit, with the right-hand end of the inner cylinder 116 and that extends partially into the interior volume defined in the left-hand or rod end facing end of the end cap assembly 134. The assembly 154 provides fluid passages, not shown, which permit unrestricted fluid communication between the reservoir compartment 122 and the space or volume defined between the assembly 154 and the assembly 134.

The rod end closure assembly 136 includes a conventional inner head member 160 that closes the left-hand or rod end of the inner cylinder 116. The inner head 160 has a reduced diameter lower portion 164, which is press fit into the inner cylinder 116, and a central aperture sized to slidably engage the piston rod 138. A conventional seal 165 is disposed within the central aperture and seals about the outer surface of the piston rod 138. The inner head 160 further includes an increased diameter upper flange 166 that extends radially towards the outer cylinder 118.

The rod end closure assembly 136 further includes a conventional seal subassembly 170 comprising a metallic outer cap 172 and an elastomeric seal member 174. Both the cap 172 and the member 174 have a respective central aperture sized to slidably engage about the piston rod 138. The cap 172 also includes a lower leg 178, which is fixedly jointed to the outer cylinder 118, to secure the seal subassembly 170 in the rod end of the shock absorber 100. A spring 180 is positioned between the inner head 160 and the seal member 174 to bias the seal member 174 against the inner face of the outer cap 172. A spring seat 182 is positioned between the spring 180 and the seal member 174 to prevent degradation of the seal member 174 by the spring 180. The central aperture of the seal member 174 includes a plurality of lips or ridges 184 which scrape against the outer diameter of the piston rod 138 to remove excess shock absorber fluid from the piston rod as it moves out of the internal chamber 120.

The rod end of the shock absorber 100 also includes a conventional retainer 190. Its upper end is connected with and moves with the piston rod 138. More specifically, the outer end 142 of the piston rod 138 includes a reduced diameter portion 192 defining a shoulder 194. The retainer 190 has a center bore 196 sized to fit around the reduced diameter portion 192 of the piston rod 138. The retainer 190 may be secured against the shoulder 194 by a hex nut which threads onto the reduced diameter portion 192 above the retainer 190. Alternately, the retainer 190 can be welded to the shoulder 194.

As is conventional, the shock absorber 100 is filled with fluid, such as hydraulic oil, pressurized air and/or a combination of both. As is explained below, the shock absorber 100 includes fluid control valving—some conventional and some novel—for permitting controlled fluid flow between the reservoir, compression and rebound compartments 122, 128 and 130 as the piston 126 moves within the internal chamber 120 thereby providing the desired selected damping force. In summary, the shock absorber 100 includes a fluid flow control system for providing controlled fluid flow between the rebound and compression compartments 128, 130 as the piston 126 moves within the internal chamber 120. This flow control system preferably includes by-pass means for permitting the controlled by-pass flow of fluid through the piston 126 from the rebound compartment 128 to the compression compartment 130 during the rebound stroke and from the compression compartment 130 to the rebound compartment 128 during the compression stroke. In this regard, the shock absorber 100 incorporates a disk-valved piston 126 such as is commonly used in the industry. The rebound by-pass means typically includes at least one rebound flow passage extending through the piston 126 between the rebound and compression compartments 128, 130. Likewise, the compression by-pass means typically includes at least one compression flow passage extending through the piston 126 between the compression and rebound compartments 130, 128. Each flow passage is conventionally valved so as to govern fluid flow between the rebound and compression compartments during rebound and compression strokes.

It will be understood that except for the assemblies 134 and 154, the construction of the shock absorber 100 as thus far described is similar to the shock absorbers described in the aforementioned patents. It will also be understood that the assemblies, subassemblies, and components thus far described may assume other designs, constructions or configurations without departing from the scope of the present invention.

Figure 2:
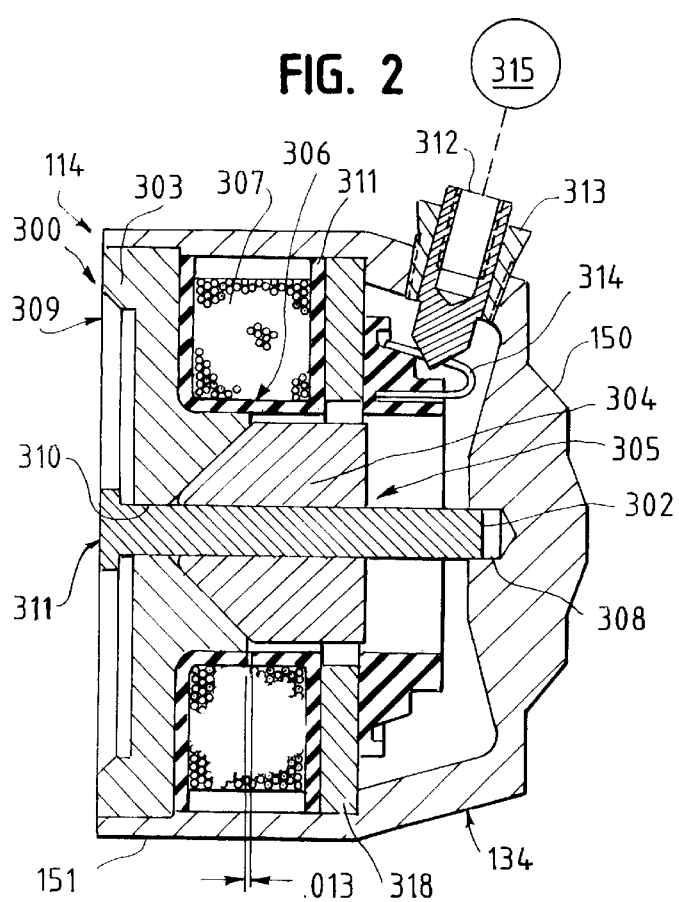
FIG. 2 is an axial, cross-sectional view of the end cap assembly of the present invention.

As illustrated in FIGS. 1 and 2, the end cap assembly 134 of the present invention includes a novel solenoid assembly or subassembly 300. This subassembly is used for selectively controllably damping the movement of the piston rod 138, with respect to the internal chamber 120, during the compression stroke of the piston 126. More specifically, the solenoid subassembly 300 includes a ferrous core 303 and a non-magnetizable, stainless steel pushrod 302 that slidably extends through the axial central portion of the fixed ferrous core 303 and is then press fit through a movable ferrous magnetizable plunger 304. The core 303 has a diameter greater than that of the compression head assembly 154 and also greater than that of the inner cylinder 116. The core 303 defines the left-hand end of the assembly 134.

The pushrod 302 is press fit with the plunger 304 after being passed through the core 303 and together the pushrod 302 and plunger 304 move, as a unit, axially. The pushrod 302 and plunger 304 constitute a plunger subassembly or assembly 305. A compression valve contact face or surface 311 is defined on the upper or left-hand end of the push rod 302. The plane of the surface 311 is perpendicular to the longitudinal axis of the push rod 302.

An annular bobbin subassembly or assembly 306 comprises a conductive wire coil 307, flux washer halves 318 and spring clip terminals 314. The flux washer halves 318 are adjacent to the lower or right-hand end of assembly 306. When installed into bobbin assembly 306 these washer halves form a complete washer. These washer halves increase the closed loop magnetic current so as to make the solenoid subassembly 300 more efficient.

Assembly 306 is connected with the core 303 and is mounted about the plunger subassembly 305. The left-hand end of the bobbin subassembly 306 abuts the right-end side of the core 303 so that, together, they form a fixed core subassembly or subassembly 309.

The longitudinal central axes of the plunger subassembly 305 and the fixed core subassembly 309 are aligned and are coaxial with the longitudinal central axis of the piston rod 138. The axial central opening of the fixed core subassembly 309, and more particularly of the core 303, is sized so that the plunger subassembly 305 may move axially with respect to the subassembly 309 and with respect to the bobbin subassembly 306. More specifically, a left-hand facing recess 308 in the member 150 and a central aperture 310 in the core 303 receive the push rod 302 and maintain the longitudinal alignment between the plunger subassembly 305 and the fixed core subassembly 309 while allowing the plunger subassembly 305 to move longitudinally or axially with respect to the fixed core subassembly 309.

As is conventional, when electrical current is driven through the coil 307, an electromagnetic field is formed. This electromagnetic field, in turn, asserts a closing force on the plunger 304 in that the field draws the plunger subassembly 305 upwardly (leftwardly) towards the compression head assembly 154. The magnitude of this closing force is a function of the electrical current flowing through the coil 307, which may be readily controlled by a conventional controller 315 shown in FIG. 2, such as those manufactured by Trombelta Motion Technologies, 13901 Main Street, Menomonee Falls, Wis. 53051. A controller for use with snowmobile shock absorbers is Trombelta Part No. D03297. A prototype controller for use with truck cab shock absorbers is Trombelta Part No. SK797-A. The electrical power is provided to the coil 307 preferably from the vehicle alternator. The AC voltage from the alternator is rectified to a DC voltage, which is then controllably applied to the coil 307.

A pair of electrical connectors 312 are mounted in the end cap member 150. Their outer ends protrude from the right-hand or outwardly facing surface of the end cap member 150. These connectors provide means for conveniently connecting the coil 307 with a source of electrical power. Each of the connectors 312 includes an annular plastic, externally threaded member 313 so that the connectors 312 can be threaded into the end cap member 150. An O-ring seal, not shown, may be disposed between the connector 312 and its associated threaded member 313. A flanged sealing gasket, also not shown, may be disposed between the member 313 and the end cap member 150. The connectors 312 (and their associated parts) are made from a heat resistant material so as to withstand heat from the welding required to attach the outer cylinder 118 and the eye connector 132 to the end cap member 150.

Each inner end of the connectors 312 conductively engages a spring clip terminal 314 (only one of which being shown in FIG. 2). The spring clip terminals 314 are, in turn, conductivity coupled to the coil 307. The spring clip terminals 314 have two functions. First, they provide an improved electrical connection between the bobbin subassembly 306 and the outside source of electrical power. Second, the engagement of the connectors 312 and terminal clips 314 prevents the bobbin subassembly 306 from rotating inside the solenoid subassembly 300 during the high speed rotation of the shock absorber 100 during the "spin" closing of the upper end of the shock absorber, that is, the end adjacent to where the piston rod 138 comes out of the assembly 136.

The bobbin subassembly 306 is conventional in most aspects. However, it is uniquely designed to hold the coil 307, which is needed to produce the electromagnetic field or magnetic flux, the two spring clip terminals 314 and the flux washer halves 318. The concept of using the spring clip terminals is novel and allows for the efficient assembly of the bobbin subassembly 306 and the other parts of the end cap assembly 134. The spring clip terminals 314 are novel in that they take the electrical power from the wire leads (not shown) attached to the connectors 312 into the bobbin subassembly 306 without the need to pull wires through the end cap member 150. Wires protruding from the member 150 would not be compatible with welding of the end mount 132 to the member 150, the seam welding of the outer cylinder 118 to the member 150, the aforementioned upper, spin closing used to close the rod end of the shock absorber adjacent to the rod 138, or the shock absorber painting processes. After the bobbin subassembly 306, which includes the spring clip terminals 314, is dropped into and properly oriented to the connector holes in the member 150, the connectors 312 may be easily screwed into the member 150 so as to, in turn, engage the spring clip terminals 314.

As illustrated in FIG. 4, the connectors 312 are disposed at predetermined angles (at 30 degrees in the preferred embodiment) with respect to the transverse axis of the opening of the eye connector 132 so as to minimize the risk of the connectors 312 (and their associated parts) being damaged during the welding operations. These protruding connectors 312 are also used as locators to orient the end cap member 150 to the eye connector 132 during the welding connection of the end cap member 150 to the eye connector 132. The orientation of the connectors 312 to the eye connector 132 transverse axis is necessary to allow the vehicle manufacturer to route the leads from the controller 315 properly to the connectors 312. In particular, in a snowmobile suspension space is limited, and the leads from the controller must be brought into the connectors 312 at a specific lateral orientation to avoid damage to the leads from the snowmobile suspension members.

As noted, a controller 315 controls the power applied to the coil 307. The controller 315 may act to control either the voltage across the coil 307 or the current through the coil 307. Where the voltage is controlled or adjusted, the controller may adjust the voltage between 3 volts (soft ride) and 14 volts (firm ride). Where the current is controlled or adjusted, the adjustment may be between 0.35 amps (soft ride) and 2.1 amps (firm ride). A voltage controller 315 is a little less expensive to manufacture. However the shock absorber temperature, and thus the coil temperature, can change due to changes in ambient temperature or due to the shock absorber heating up from severe use. And a voltage controller has no way of compensating for coil resistance changes due to such shock absorber coil temperature changes. In other words, the voltage is held constant by a voltage controller regardless of the temperature of the coil 307, and the solenoid assembly's clamping force, and thus the shock absorber damping force varies with changes to the shock absorber coil resistance.

In contrast, a current controller 315 has an advantage in that when the shock absorber's coil temperature changes, the current controller adjusts the current to the previously set value. This helps keep the damping forces from changing with the changing temperatures. If the ambient temperature were to get colder from the time when the coil current was set for a particular damping adjustment, without the current controller's compensating effect, the shock damping would increase due to increased coil current flow resulting from the reduced coil resistance that lowered temperatures caused. An ambient warming of the shock absorber, or heating up of the shock due to severe use, will have the opposite effect without compensation. In other words, without compensation if shock temperature increases, the damping force will decrease due to resistance of the coil 307 increasing with increased shock coil temperature. In the absence of current compensation the increased coil resistance/temperature reduces the amount of coil current flow, which controls the amount of magnetic flux generated in the coil. In the absence of current compensation the reduced flux would thereby reduce the clamping force that controls the damping level.

The controller 315 may be, for example, mounted on the handle bars of the snowmobile where it can be selectively actuated by the driver to reflect changes in the terrain and/or the driver's desire to change the damping characteristics. Alternatively, the controller 315 could be positioned at other locations on the vehicle.

Figure 3:
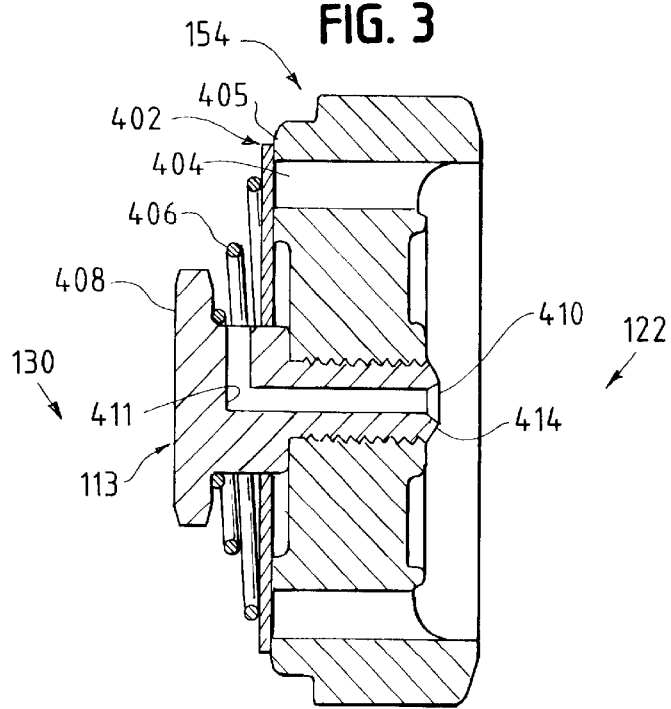
FIG. 3 is an axial, cross-sectional view of the compression head assembly of the present invention.

Referring now to FIG. 3, the compression head assembly 154 includes a compression head member 405 that closes the inner cylinder 116. More specifically, the periphery of the upper-facing end is connected with the lower-facing end of the cylinder 116, and the periphery of the lower-facing end abuts the upper-facing end of the core 303. A replenishing valve disk 402 regulates the flow of fluid through the replenishing flow passage 404 in the member 405. A spring 406 normally biases the valve disk 402 to a flow blocking position by having the disk contact a replenishing valve seat, which surrounds the upper or left end of the passage 404. The upper end of the spring 406 is held in place by a retaining member 408 that is threaded into an axial, central opening in the member 405.

A compression flow passage 410 passes through the retaining member 408 and connects the compression compartment 130 to the reservoir compartment 122. The flow passage 410 preferably contains an axial portion and a right angle portion 411 that is adjacent the compartment 130 and that serves to break up fluid flow and prevent the relatively heavy plunger subassembly 305 from resonating at higher vehicle speeds. A compression valve seat 414 is located at the lower or right-hand end of the retaining member 408, that is, the end adjacent to the assembly 134. The compression valve contact surface 311 of the plunger subassembly 305 is normally biased against the valve seat 414, that is, to a fluid flow blocking position, with the electromagnetically induced closing force of the solenoid subassembly.

The longitudinal axes of the plunger subassembly 305 and the compression valve seat 414 are aligned so that the longitudinal or axial motion of the subassembly 305, relative to the fixed core subassembly 309, increases and decreases the distance between the contact surface 311 and the compression valve seat 414. The flow of fluid from the compression compartment 130 to the reservoir compartment 122 is regulated by the interaction or spacial relationship between the surface 311 of the pushrod 302 and the compression valve seat 414.

When the electromagnetic field is formed, the plunger subassembly 305 is moved to a position where the upper or left-hand end of the pushrod 302 contacts the assembly 154, as described below, and where the upwardly (leftwardly) facing surface of the plunger 304 is spaced or gapped from the adjacent rearwardly (rightwardly) facing congruent surface of the core 303 by predetermined distance; in the preferred embodiment, 0.013 inches. This 0.013 inch air gap is maintained between the plunger subassembly 305 and the core 303 when the compression valve surface 311 is pressed against the compression valve seat 414 so as to block flow through the passage 410.

When the fluid pressure in the compression compartment 130 increases so as to overcome the electromagnetic closing force, the plunger subassembly 305 is pushed away (or pushed open) from the valve seat 414, by as much as 0.008 inch, so that the rate of flow out of the passage 410 is equal to the rate of flow coming into the passage 410. The solenoid assembly 300 maintains its force on the plunger at this maximum spacing between the surface 311 and the seat 414. When the subassembly 305 is moved away from contact with the valve seat 414, due to the flow, there is a spacing of 0.021 inches (0.013 inch air gap plus 0.008 inch deflection) between the core 303 and plunger 304.

There is an important advantage to having an air gap of some dimension between the core 303 and the plunger 304. If there was no air gap at all, the force required to move the compression valve open, as described above, would be too high. Also, if there was no air gap at all when the high force required to open the valve was met, the valve would open uncontrollably. If the air gap was too large, then the force of the solenoid assembly 300 would be too weak instead of too strong. If the solenoid force was too weak due to too a large a gap, then there would be inadequate clamping force and hence inadequate damping adjustment available. So the 0.013 inch air gap in the preferred embodiment is the correct air gap, so that the force of the solenoid assembly 300 is neither too strong nor weak and so the opening force is in a controllable range.

The 0.008 inch opening spacing between the seat 414 and surface 311 is also important. If the compression valve moved away from the seat 414 much more than the 0.008 inch, in the preferred embodiment, the force of the solenoid assembly 300 would become too weak due to an excessive air gap at this maximum valve open position. Therefore, with an air gap much larger than the 0.013 inch plus the 0.008 inch gap at the valve full open position, the solenoid assembly would not have the force to close the compression valve (that is, have the surface 311 press against the seat 414) even when the oil flow through passage 410 had stopped.

The closing force between the fixed core assembly 309 and the plunger assembly 305 effectively provides an adjustable compression valve closing force that acts to inhibit the flow of fluid through the compression flow passage 410. By controlling the controller 315, the closing force may be selectively adjusted to achieve desired damping characteristics. In summary, during the compression stroke of the shock absorber 100, the fluid pressure in the compression compartment 130, and thus in the flow passage 410, acts on the compression valve surface 311. Thus the fluid pressure in the compression compartment 130 creates an opening force on the plunger assembly 305 opposing the electromagnetically induced closing force applied to the plunger subassembly 305. When this opening force exceeds this closing force, the plunger assembly 305 is unseated from the compression valve seat 414, which enables fluid to flow from the compression compartment 130 to the reservoir compartment 122 through the passage 410.

When the present invention is incorporated into a motor vehicle shock absorption system, selective manual or autonomous control of shock absorber damping is possible. A vehicle operator may selectively add stiffness or compliance to the vehicle shock absorption system, or an autonomous control system may act, in real-time, to adjust shock absorption damping in response to detected changes in driving conditions. For example, in this latter regard, acceleration or position sensors may, for example, be located at various places on the vehicle or the shock absorbers to provide acceleration or position information to the controller 315 that, in turn, makes damping magnitude decisions and provides the appropriate electrical stimulus to the plunger subassembly 305 through the coil 307. Vehicle speed information may also be collected and used to make damping decisions. More specifically, the present invention provides real-time shock absorption damping control that, in turn, allows vehicle operators or autonomous control systems to make damping adjustments in response to changing driving conditions and/or changes in desired driving characteristics. An operator may choose to sacrifice ride comfort for handling in poor driving conditions resulting in safer travel. Similarly, a less comfortable, better handling ride may be chosen in an emergency situation. Conversely, in good driving conditions, an operator may chose a more comfortable ride resulting in a more relaxed driving environment and less mechanical stress on the vehicle.

Another commercially advantageous feature of the present invention is the facility by which the novel compression head assembly 154 and the end cap assembly 134 may be preassembled, preferably before the final manufacture of the shock absorber 100, and then assembled, with the other shock absorber components, when the shock absorber 100 is manufactured in an assembly line manufacturing operation. As noted, the assembly 154 comprises four parts: the compression head member 405, the disk 402, the spring 406, and the retaining member 408. These parts can be readily assembled together because they do not have to be oriented, relative to each other, regarding a specific reference point. For instance, the member 408 can be threaded into the member 405 without regard to the radial direction the portion 411 of the passage 410 points.

Similarly, the assembly 154 can be mated within the right-hand end of the inner cylinder 116 without having to laterally orient the assembly with respect to other parts of the cylinder or even the shock absorber. Again, for instance, without having to direct the axial portion 411 of the passage 410 in any particular radial direction. Thus placing the assembly 154 in the inner cylinder 116 is a relative quick and trouble-free operation.

Like the assembly 154, the subassemblies and components of the assembly 134 may be put together with a minimum of time and effort. First, the core 303 including the plunger subassembly 305 is put together with the bobbin subassembly 306. Then the assembler need only orient the openings for the connectors 312 with the clips 314 and then fit those subassemblies and parts within the member 150. The assembly 134 is next mated within the right-hand end of the outer cylinder 118, again without regard to the lateral orientation of the assembly 134 with respect to the cylinder 118. As noted above, the connector 132 can be welded to the member 150 prior to the weld attachment of the outer cylinder 118 using the connectors 312 as guides to facilitate the proper location of the connector 132 on the member 150.

Once the inner cylinder 116 is press fit onto the novel compression head assembly 154 it can be lowered without lateral orientation into the outer cylinder 118 welded onto the novel end cap assembly 134. This is an important benefit in a manufacturing environment where cycle time for assembly of parts is important.

As will be appreciated by those skilled in the art, the present invention could also be used with a monotube having a remote fluid reservoir. The solenoid assembly could then be disposed in the reservoir, preferably near the reservoir entrance, or in the line connecting the reservoir with the monotube.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features, which come within the spirit and scope of the invention.

What is claimed:

1. In a shock absorber capable of providing selectively adjustable damping forces, the shock absorber including:
    an inner cylinder assembly defining an internal chamber that has a rod end and a closed end and that has a central longitudinal axis extending between the rod and closed ends;
    a piston assembly that is slidably mounted for reciprocal, axial movement within the internal chamber in a compression stroke direction and in a recoil stroke direction and that defines a rebound compartment adjacent the rod end of the inner cylinder and a compression compartment adjacent the closed end of the inner cylinder, with the volumes of the rebound and compression compartments varying in accordance with the position of the piston assembly in the internal chamber, with the rebound and compression compartments being adapted to be filled with fluid, and with the piston assembly defining one axial end of the compression compartment;
    a piston rod that is connected to the piston assembly and that extends from the rod end of the internal chamber;
    a closure assembly that closes the rod end of the internal chamber and that slidably and sealingly engages about the piston rod;
    a fluid reservoir compartment that is in fluid communication with the rebound and compression compartments;
    a compression head assembly that is in the internal chamber adjacent the closed end and that defines the other axial end of the compression compartment, the compression assembly including a first surface adjacent to the compression compartment, a second surface adjacent the closed end and a compression flow passage, with the compression flow passage having an inlet end and an outlet end, with the inlet end of the compression flow passage being adjacent the first surface, with the outlet end of the compression flow passage being adjacent the second surface, with the compression flow passage extending between the first surface and the second surface so as to permit fluid flow from the compression compartment to the reservoir compartment when the piston assembly moves in a compression stroke direction and with a valve seat being defined adjacent the outlet end, the improvement comprising:
    an end cap assembly including a solenoid subassembly that has a bobbin subassembly which when energized, creates a electromagnetic field; that has a fixed, magnetizable core which has a first surface adjacent the second surface of the compression head assembly and which has a second surface adjacent the closed end of the shock absorber; that has a plunger subassembly which is axially movable with respect to the core, and which has a push rod which has a magnetizable plunger connected to and movable with the push rod, with a first end of the push rod being adapted to contact the valve seat so as to prevent fluid flow through the compression flow passage of the compression head assembly when the plunger subassembly is moved to a first axial position and being adapted to be spaced from the valve seat a predetermined distance so as to permit fluid flow through the compression flow passage when the plunger subassembly is moved to a second axial position; the plunger subassembly being disposed, with respect to the bobbin subassembly and the core, so that upon energization of the bobbin subassembly, the plunger subassembly is moved to the first axial position and so that an air gap, having a predetermined dimension, exists between a portion of the second surface of the core and an axially adjacent portion of the plunger when the plunger subassembly is in the first axial position.

2. The improved shock absorber as described in claim 1 wherein the shock absorber includes an outer cylinder that is disposed concentrically about the inner cylinder; and wherein the annular volume between the inner and outer cylinders serves as the reservoir compartment.

3. The improved shock absorber as described in claim 2 wherein the end cap assembly includes an end cap member that is mounted on the closed end of the outer cylinder; wherein the compression head assembly is mounted on the closed end of the inner cylinder; wherein the diametric dimension of the core is substantially the same as the diameter of the outer cylinder; wherein the diametric dimension of the compression head assembly is substantially the same as the diameter of the inner cylinder; and wherein the end cap member encloses the compression head assembly and the solenoid subassembly.

4. The improved shock absorber as described in claim 1 wherein the longitudinal axes of the pushrod, the valve seat, and the inner cylinder are coaxial; and wherein the compression flow passage includes a portion, which is adjacent to the first surface of the compression head assembly, disposed at an angle with respect to the longitudinal axis of the inner cylinder.

5. The improved shock absorber as described in claim 1 wherein the portion of the second surface of the core and the portion of the plunger are adjacent the push rod when the plunger subassembly is moved to the first axial position; and wherein the portion of the second surface of the core and the portion of the plunger are shaped congruently so that the air gap is uniform when the plunger subassembly is in the first axial position.

6. The improved shock absorber as described in claim 5 wherein the air gap is approximately 0.013 inches; and wherein the spacing between the first surface of the push rod and the valve seat when the plunger subassembly is moved to its second axial position is 0.008 inches.

7. The improved shock absorber as described in claim 1 wherein the bobbin subassembly, in part, encircles the plunger subassembly.

8. In a shock absorber capable of providing selectively adjustable damping forces, the shock absorber including:
   an inner cylinder assembly defining an internal chamber that has a rod end and a closed end and that has a central longitudinal axis extending between the rod and closed ends;
   a piston assembly that is slidably mounted for reciprocal, axial movement within the internal chamber in a compression stroke direction and in a recoil stroke direction and that defines a rebound compartment adjacent the rod end of the inner cylinder and a compression compartment adjacent the closed end of the inner cylinder, with the volumes of the rebound and compression compartments varying in accordance with the position of the piston assembly in the internal chamber, with the rebound and compression compartments being adapted to be filled with fluid, and with the piston assembly defining one axial end of the compression compartment;
   a piston rod that is connected to the piston assembly and that extends from the rod end of the internal chamber;
   a closure assembly that closes the rod end of the internal chamber and that slidably and sealingly engages about the piston rod;
   a fluid reservoir compartment that is in fluid communication with the rebound and compression compartments;
   a compression head assembly that is in the internal chamber adjacent the closed end and that defines the other axial end of the compression compartment, the compression head assembly including a first surface adjacent to the compression compartment, a second surface adjacent the closed end and a compression flow passage, with the compression flow passage having an inlet end and an outlet end, with the inlet end of the compression flow passage being adjacent the first surface, with the outlet end of the compression flow passage being adjacent the second surface, with the compression flow passage extending between the first surface and the second surface so as to permit fluid flow from the compression compartment to the reservoir compartment when the piston assembly moves in a compression stroke direction, and with a valve seat being defined adjacent the outlet end, the improvement comprising:
   an end cap assembly including an end cap member and a solenoid subassembly that has a bobbin subassembly which when energized, creates a electromagnetic field; that has a fixed, magnetizable core; that has a plunger subassembly which is axially movable with respect to the core, and which has a push rod which has a magnetizable plunger connected to and movable with the push rod, with a first end of the push rod being adapted to contact the valve seat so as to prevent fluid flow through the compression flow passage of the compression head assembly when the plunger subassembly is moved to a first axial position and being adapted to be spaced from the valve seat a predetermined distance when the plunger subassembly is moved to a second axial position, with the power of the electromagnetic field being determined by a controller, with the bobbin subassembly having a coil electrically connected with a pair of electrically conductive spring clip terminals which are adjacent the end cap member, and with the end cap member having a pair of spaced openings therethrough, with each of the openings having therein an electrical connector which extends through the end cap member and which serve to provide a portion of the electrical connection between the controller and the spring clips.

9. The improved shock absorber as described in claim 8 wherein the end cap member includes an exterior facing surface; wherein means for connecting the shock absorber to selectively one of a vehicle body or a vehicle suspension system is connected with exterior facing surface; and wherein the electrical connectors are spaced a predetermined radial distance from the longitudinal axes of the inner cylinder and at a predetermined angle with respect to each other to facilitate properly locating the connecting means on the exterior surface.

10. The improved shock absorber as described in claim 8 wherein the plunger subassembly is disposed, with respect to the bobbin subassembly and the core, so that upon energization of the bobbin subassembly, the plunger subassembly is moved to the first axial position and so that an air gap, having a predetermined dimension, exists between a portion of the second surface of the core and an axially adjacent portion of the plunger when the plunger subassembly is in the first axial position.

11. The improved shock absorber as described in claim 8 wherein the bobbin subassembly includes a flux washer so as to increase the power of the electromagnetic field.

12. The improved shock absorber as described in claim 9 wherein the electrical connectors are made from a heat resistant material so as to permit welding of the connecting means and the outer cylinder to the end cap member.

13. The improved shock absorber of claim 9 wherein the spring clip terminals are disposed and oriented on the end cap member so as to maximize the distance that the spring clip terminals are from the area of weld heat related to the connection of the connecting means and the outer cylinder to the end cap assembly and so as to prevent rotation of the bobbin subassembly during the manufacture of the shock absorber.

14. In a shock absorber capable of providing selectively adjustable damping forces, the shock absorber including:
   an inner cylinder assembly defining an internal chamber that has a rod end and a closed end and that has a central longitudinal axis extending between the rod and closed ends;
   a piston assembly that is slidably mounted for reciprocal, axial movement within the internal chamber in a compression stroke direction and in a recoil stroke direction and that defines a rebound compartment adjacent the rod end of the inner cylinder and a compression compartment adjacent the closed end of the inner cylinder, with the volumes of the rebound and compression compartments varying in accordance with the position of the piston assembly in the internal chamber, with the rebound and compression compartments being adapted to be filled with fluid, and with the piston assembly defining one axial end of the compression compartment;
   a piston rod that is connected to the piston assembly and that extends from the rod end of the internal chamber;
   a closure assembly that closes the rod end of the internal chamber and that slidably and sealingly engages about the piston rod;
   a fluid reservoir compartment that is in fluid communication with the rebound and compression compartments, the improvement comprising:

a compression head assembly that is in the internal chamber adjacent the closed end; that closes the compression end of the inner cylinder; that defines the other axial end of the compression compartment; that has a compression head member which has a first surface adjacent to the compression compartment, a second surface adjacent the closed end, a first opening therein, and a replenishing flow passage extending between the first and second surfaces and defining a first valve seat adjacent the first surface; that has a replenishing valve which is movable between a first position where the replenishing valve contacts the first valve seat and blocks fluid flow through the replenishing passage and a second position where the fluid may flow through the replenishing passage; that has a retaining member which is connected within the first opening, which has a neck portion extending into the compression compartment, which includes a compression flow passage extending between the first surface and the second surface so as to permit fluid flow from the compression compartment to the reservoir compartment when the piston assembly moves in a compression stroke direction, with the compression flow passage having an inlet end and an outlet end, with the inlet end of the compression flow passage being adjacent the first surface, with the outlet end of the compression flow passage being adjacent the second surface of the compression head, with a compression valve seat being defined adjacent the outlet end, and with the portion of the compression flow passage being in the neck portion and being disposed at an angle with respect to the longitudinal axis of the inner cylinder; and a spring extending between the neck portion and the replenishing valve and biasing the replenishing valve to the first position; and an end cap assembly including a solenoid subassembly that has a bobbin subassembly which when energized, creates a electromagnetic field; that has a fixed, magnetizable core which has a first surface adjacent and spaced from the second surface of the compression head assembly and which has a second surface adjacent the closed end of the shock absorber; that has a plunger subassembly which is axially movable with respect to the core, which has a push rod and which has a magnetizable plunger connected to and movable with the push rod, with a first end of the push rod being adapted to contact the compression valve seat so as to prevent fluid flow through the compression flow passage of the compression head assembly when the plunger subassembly is moved to a first axial position and being adapted to be spaced from the compression valve seat a predetermined distance so as to permit fluid flow through the compression flow passage when the plunger subassembly is moved to a second axial position; the plunger subassembly being disposed, with respect to the bobbin subassembly and the core, so that upon energization of the bobbin subassembly, the plunger subassembly is moved to the first axial position.

15. The improved shock absorber as described in claim 14 wherein the plunger subassembly is disposed, with respect to the bobbin subassembly and the core, so that upon energization of the bobbin subassembly, the plunger subassembly is moved to the first axial position and so that an air gap, having a predetermined dimension, exists between a portion of the second surface of the core and an axially adjacent portion of the plunger when the plunger subassembly is in the first axial position.

16. The improved shock absorber as described in claim 14 wherein the shock absorber includes an outer cylinder that is disposed concentrically about the inner cylinder; and wherein the annular volume between the inner and outer cylinders serves as the reservoir compartment.

17. The improved shock absorber as described in claim 16 wherein the end cap assembly includes an end cap member that is mounted on the closed end of the outer cylinder; wherein the compression head assembly is mounted on the closed end of the inner cylinder; wherein the diametric dimension of the core is substantially the same as the diameter of the outer cylinder; wherein the diametric dimension of the compression head assembly is substantially the same as the diameter of the inner cylinder; and wherein the end cap member encloses the compression head assembly and the solenoid subassembly.

18. The improved shock absorber as described in claim 14 wherein the longitudinal axes of the pushrod, the valve seat, and the inner cylinder are coaxial; and wherein the compression flow passage includes a portion, which is adjacent to the first surface of the compression head assembly, disposed at an angle with respect to the longitudinal axis of the inner cylinder.

19. The improved shock absorber as described in claim 15 wherein the portion of the second surface of the core and the portion of the plunger are adjacent the push rod when the plunger subassembly is moved to the first axial position; and wherein the portion of the second surface of the core and the portion of the plunger are shaped congruently so that the air gap between the portions is uniform when the plunger subassembly is in the first axial position.

20. The improved shock absorber as described in claim 19 wherein the air gap is approximately 0.013 inches; and wherein the spacing between the first surface of the push rod and the valve seat when the plunger subassembly is moved to its second axial position is 0.008 inches.

21. A method for manufacturing a shock absorber where the shock absorber includes:
an inner cylinder defining an internal chamber that has a rod end and a closed end and that has a central longitudinal axis extending between the rod and closed ends;
an outer cylinder that is disposed concentrically about the inner cylinder, with the inner and outer cylinders defining an annular volume therebetween that serves as a fluid reservoir compartment;
a piston assembly that is slidably mounted for reciprocal, axial movement within the internal chamber in a compression stroke direction and in a recoil stroke direction and that defines a rebound compartment adjacent the rod end of the inner cylinder and a compression compartment adjacent the closed end of the inner cylinder, with the volumes of the rebound and compression compartments varying in accordance with the position of the piston assembly in the internal chamber, with the rebound and compression compartments being adapted to be filled with fluid, and being in fluid communication with the reservoir compartment, and with the piston assembly defining one axial end of the compression compartment;
a piston rod that is connected to the piston assembly and that extends from the rod end of the internal chamber;
a closure assembly that closes the rod end of the internal chamber and that slidably and sealingly engages about the piston rod;

a compression head assembly that is in the internal chamber adjacent the closed end and that defines the other axial end of the compression compartment, the compression head assembly including a first surface, a second surface and a compression flow passage, with the compression flow passage having an inlet end and an outlet end, and extending between the first surface and the second surface with the inlet end of the compression flow passage being adjacent the first surface, with the outlet end of the compression flow passage being adjacent the second surface of the compression head, and with a valve seat being defined adjacent the outlet end;

an end cap assembly including an end cap member; and a solenoid subassembly that has a bobbin subassembly which when energized, creates a electromagnetic field; that has a fixed, magnetizable core which has a first surface and a second surface; that has a plunger subassembly which is adjacent the second surface of the core, which is axially movable with respect to the core, and which has a push rod which has a magnetizable plunger connected to and movable with the push rod, with a first end of the push rod being adapted to contact the valve seat so as to prevent fluid flow through the compression flow passage of the compression head assembly when the plunger subassembly is moved to a first axial position and being adapted to be spaced from the valve seat a predetermined distance when the plunger subassembly is moved to a second axial position, with the bobbin subassembly having a coil electrically connected with a pair of electrically conductive spring clip terminals which are adjacent the end cap member, and with the end cap member having a pair of spaced openings therethrough, with each of the openings having therein an electrical connector which extends through the end cap member and which serve to provide a portion of the electrical connection between a controller and the spring clips, the improvement comprising:

placing the end cap assembly in the closed end of the outer cylinder and without regard to orienting the end cap assembly laterally with respect to the outer cylinder:

securing the end cap assembly to the closed end of the outer cylinder placing the compression head assembly in the closed end of the inner cylinder so that the first surface of the compression head assembly will face the piston assembly and without regard to orienting the compression head assembly laterally with respect to the inner cylinder;

securing the compression head assembly to the closed end of the inner cylinder;

placing the compression head assembly and inner cylinder as assembled together into the outer cylinder and end cap assembly as assembled together so that the second surface of the compression head assembly is adjacent to the first surface of the core and without regard to orienting the compression head assembly and inner cylinder as assembled laterally with respect to the outer cylinder and end cap assembly as assembled; and placing and securing all other components into the rod ends of the inner and outer cylinders without regard to laterally orienting those components to the inner cylinder, compression head assembly, outer cylinder, or end cap assembly.

* * * * *